(No Model.)
T. COLLINS & E. L. HARTMANN.
CREAM SEPARATOR.
No. 589,641. Patented Sept. 7, 1897.
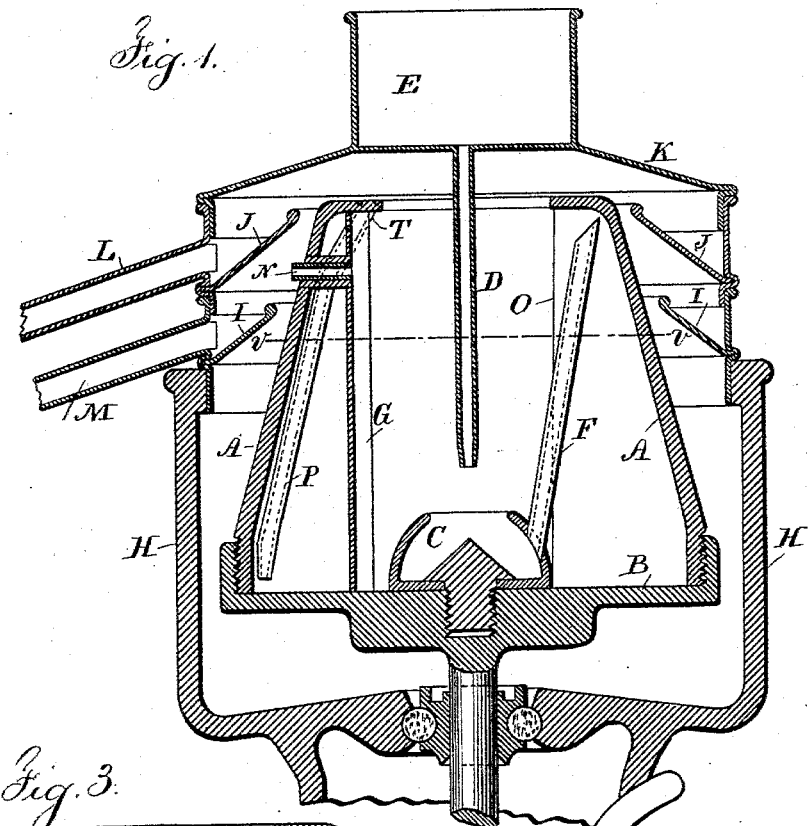
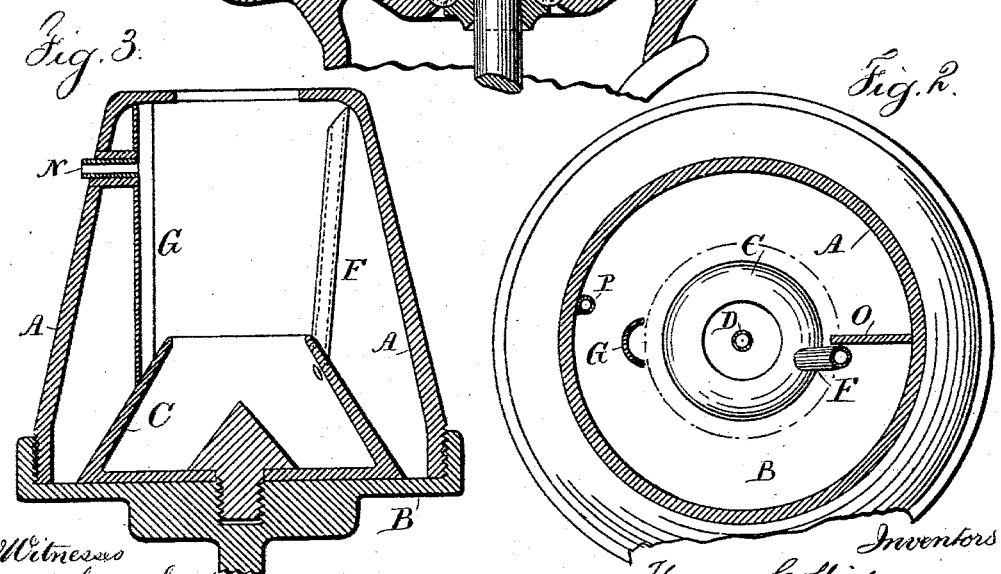
Witnesses
Chas. H. Smith
Geo. T. Pinckney
Inventors
Thomas Collins
Ernest L. Hartmann
per L. W. Serrell & Son Attys

UNITED STATES PATENT OFFICE.

THOMAS COLLINS AND ERNEST LOUIS HARTMANN, OF BAINBRIDGE, NEW YORK.

CREAM-SEPARATOR.

SPECIFICATION forming part of Letters Patent No. 589,641, dated September 7, 1897.

Application filed October 29, 1894. Serial No. 527,386. (No model.)

*To all whom it may concern:*

Be it known that we, THOMAS COLLINS, a subject of the Queen of Great Britain, and ERNEST LOUIS HARTMANN, a citizen of the United States, residing at Bainbridge, in the county of Chenango and State of New York, have invented an Improvement in Cream-Separators, of which the following is a specification.

Centrifugal separators have heretofore been made with a conical bowl that is rapidly revolved by a vertical shaft, and milk has been supplied into a cup within the bowl and at the bottom thereof, and in some instances a channel has been provided at the edge of the vane within the bowl, such channel being open at one end for the cream to pass in and the delivery being through a lateral tube.

We find in practice that the centrifugal action, which tends to throw the skim-milk and heavier material outwardly and to displace the cream and cause the same to come inwardly, is nearly uniform throughout the entire apparatus, but where the cream is taken off at one place in the cream-wall such cream-wall becomes the thinnest at this part, and there is an accumulation of cream in the other parts of the cream-wall, so that the action is not uniform and the rapidity of the operation is thereby lessened.

In our improvement we employ a cream-trough that is parallel with the axis of rotation, so as to present straight edges over which the cream is caused to pass in a very thin layer, and thus the cream is skimmed uniformly throughout the entire length of the cream-wall and passes by the trough to the delivery-tube, and in this operation the skim-milk and heavier portions that may remain with the cream are still further and more completely separated, as the particles of cream substantially float and pass over the edge of the cream-trough, leaving the skim-milk or heavier liquid behind to gradually pass off toward the inner surface of the centrifugal bowl and thence by the skim-milk discharge-pipe.

In the drawings, Figure 1 is a vertical section of the improved apparatus. Fig. 2 is a sectional plan view of the bowl at the line $v\ v$, and Fig. 3 is an illustration of a modification.

The centrifugal bowl A and its bottom or base B are supported by the ordinary vertical shaft of the separator, so as to be rotated as usual, and there is a surrounding case H, upon which rests the cream-pan I with its spout M, and this in turn supports the skim-milk pan J with its spout L, and there is a cover K with the milk-holder E thereon, and from this milk-holder the tube D passes down into the centrifugal separator, so that the milk passes into the receiving-cup C. This cup C may be hemispherical, as represented in Fig. 1, or conical, as shown in Fig. 3.

The milk as it is received into the cup C is exposed to a preliminary centrifugal action and passes off from this cup C by the pipe F to near the upper end of the conical centrifugal bowl A, and it is advantageous to provide in this bowl a wing O, which insures the proper rotation of the liquid along with the centrifugal bowl, and the skim-milk pipe P is open at its lower end closely adjacent to the interior of the bowl at its largest diameter, and this pipe P passes through the inwardly-projecting flange at the top of the centrifugal bowl, so that the heavier material or skim-milk passes from the top surface of the centrifugal bowl into the pan J, and it is advantageous to have the upper end T of the skim-milk tube P open to facilitate the cleaning thereof.

The cream-trough G is advantageously in the form of a half-pipe, and its edges are parallel with the axis of rotation, and they are at the proper distance from the axis of rotation to coincide with the surface of the cream-wall, and from the upper part of the cream-trough the delivery-pipe N passes off laterally and through the bowl and above the cream-pan I.

It will now be understood that when the milk is supplied from the vessel E it passes down through the tube D into the cup C, and it will accumulate therein and pass up by the pipe F into the interior of the centrifugal separating-bowl A and then descend into the larger part of the bowl and accumulate therein, and by the centrifugal action the cream-wall becomes vertical and cylindrical and the cream accumulates until it flows in a very thin layer over one edge of the cream-trough G, which cream-trough in this manner skims the entire inner surface of the cream-wall, taking away only the richest of the cream, and the cream passes up and is discharged near the upper end of the bowl. The globules of cream substantially float as they pass over the edge of the cream-trough, the water or heavier portions of the liquid remaining in the centrifugal bowl and passing downwardly into the larger part of the bowl and then discharging upwardly through the skim-milk pipe P into the pan J, and the cream flows up the trough G and passes off laterally by the pipe N into the pan J. Hence the milk passes first downward, then upward, and then again downward, and then again upward, both milk and cream discharging at or near the top of the bowl. By this means the separating operation is rendered very perfect and rapid, and we find it advantageous to place a cream-trough at the opposite side of the bowl to the wing O in order that the cream-wall at the place where the cream is skimmed by the trough may not be disturbed by the action of the wings upon the liquid contents of the bowl.

We claim as our invention—

1. The combination in a centrifugal separator for cream and similar material, of a conical separator-bowl, a milk-receiving cup at the bottom within such bowl, a pipe passing up from said cup and delivering the liquid within the bowl near the top thereof, and a cream-trough having its edges parallel with the axis of rotation and a lateral delivery-pipe for discharging the cream from such trough, substantially as set forth.

2. The combination in a centrifugal separating apparatus, of a centrifugal bowl, a milk-supply pipe, a pipe for the discharge of the skim-milk open at its lower end near the interior of the bowl where the bowl is of the largest diameter and passing through the upper part of the bowl, a cream-trough having its cream-receiving edge straight from end to end and parallel with the axis of rotation and a pipe passing off laterally from such trough for the discharge of the cream, substantially as set forth.

3. The combination in a centrifugal separating apparatus, of a centrifugal bowl, a milk-supply pipe, a pipe for the discharge of the skim-milk open at its lower end near the interior of the bowl where the bowl is of the largest diameter and passing through the upper part of the bowl, a cream-trough having its cream-receiving edge straight from end to end and parallel with the axis of rotation, and a pipe passing off laterally from such trough for the discharge of the cream, and a wing within the bowl and at the opposite side thereof to the cream-trough, substantially as set forth.

4. A centrifugal separator-bowl having a distributing-cup at the base, a conduit communicating at the lower end directly with said cup and at the upper end with the upper portion of the separating-chamber of the bowl, a skim-milk discharge-pipe communicating with the lower portion of said separating-chamber and extending to and discharging at the upper part of the bowl, whereby the milk is compelled to pass first downward then upward, and then again downward and then again upward, both milk and cream discharging at or near the top of the bowl substantially as specified.

THOS. COLLINS.
ERNEST LOUIS HARTMANN.

Witnesses:
J. K. ORTMON,
JOHN R. KIRBY.